(12) United States Patent
Diamant

(10) Patent No.: US 6,983,337 B2
(45) Date of Patent: Jan. 3, 2006

(54) METHOD, SYSTEM, AND PROGRAM FOR HANDLING DEVICE INTERRUPTS

(75) Inventor: Nimrod Diamant, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 10/323,244

(22) Filed: Dec. 18, 2002

(65) Prior Publication Data

US 2004/0122986 A1 Jun. 24, 2004

(51) Int. Cl.
*G06F 3/00* (2006.01)

(52) U.S. Cl. .............................. 710/48; 710/47; 710/29; 710/8

(58) Field of Classification Search ................... 710/48, 710/8, 29, 36–47
See application file for complete search history.

(56) References Cited

U.S. PATENT DOCUMENTS

| | | | | |
|---|---|---|---|---|
| 5,375,225 A | * | 12/1994 | Dean et al. | 703/25 |
| 5,535,397 A | * | 7/1996 | Durante et al. | 710/267 |
| 5,875,343 A | * | 2/1999 | Binford et al. | 710/263 |
| 5,881,296 A | * | 3/1999 | Williams et al. | 710/263 |
| 6,356,963 B1 | * | 3/2002 | Maguire et al. | 710/48 |

OTHER PUBLICATIONS

Brooks, Lame. "RE: Message Signalled Interrupt Support". [online], Mar. 24, 2000. [Retrieved on Nov. 26, 2002]. Retrieved from the Internet at <URL: http://www.pcisig.com/reflector/msg02868.html>.

Motorolla, "Interrupt Controller", *MCF5307 User's Manual*. Chapter 9, pp. 9–1–9–8.

PCI Special Interest Group, "PCI Local Bus Specification", © 2002 PCI Special Interest Group. Revision 2.3, Mar. 29, 2002, pp. 218–225.

U.S. Patent Application for Intel Case No. P15007, filed Dec. 18, 2002, entitled "Method, System, and Program for Handling Interrupt Requests", invented by N. Diamant.

Venturcom, "Tech Notes Detail: PCI/CompactPCI Interrupt Routing Impacting RTX". © 2002 Venturcom, Inc. [online], [Retrieved on Nov. 26, 2002]. Retrieved from the Internet at <URL: http://support.vci.com/support/Technotes/technote:_detail.asp?TechNoteID=78>.

* cited by examiner

*Primary Examiner*—Jeffrey Gaffin
*Assistant Examiner*—Alan Chen
(74) *Attorney, Agent, or Firm*—David W. Victor; Konrad Raynes & Victor LLP

(57) ABSTRACT

Provided are a method, system, and program implemented by a device driver executing in a computer for handling interrupts from an associated device, wherein the device driver is capable of interfacing with the associated device. The device driver receives a call requesting whether an interrupt received from a device is from the associated device and reads interrupt status information in memory within the computer to determine whether the associated device transmitted the interrupt, wherein the device writes the interrupt status information to the memory. If the associated device transmitted the interrupt, then the device driver requests resources from the operating system to handle the interrupt.

32 Claims, 9 Drawing Sheets

METHOD, SYSTEM, AND PROGRAM FOR HANDLING DEVICE INTERRUPTS

BACKGROUND OF THE INVENTION

1. Field of the Invention

The present invention relates to a method, system, and program for handling device interrupts.

2. Description of the Related Art

In many operating systems, such as Microsoft Windows®, Linux®, Unix®, etc. multiple devices may communicate over a bus interface with the operating system interrupt service routine (ISR) using a single interrupt line. (Microsoft and Windows are registered trademarks of Microsoft Corporation, Linux is a registered trademark of Linus Torvalds, UNIX is a registered trademark of The Open Group). One of multiple devices using an interrupt line, would assert an interrupt on the bus to the interrupt line assigned to that device to request or transmit data to the operating system. The operating system would further execute various device driver programs that provide a software interface between the operating system and the device. A device driver includes device specific commands to communicate with and control one attached device. Upon receiving a device interrupt, the operating system ISR would poll each device driver interrupt service routine (ISR) running in the operating system to identify the device driver ISR associated with the device that asserted the interrupt.

In response to receiving the polling request from the operating system ISR asking the device driver ISR whether the interrupt is from the device driver's device, the device driver ISR communicates with the associated device and reads an interrupt status register in the device to determine whether the driver's device sent the interrupt request. In Microsoft® Windows® operating systems, if the driver's device status registers indicate that the device did send an interrupt request, then the device driver ISR responds to the operating system ISR by claiming the interrupt and requesting a deferred procedure call (DPC) to process the device request that is the subject of the interrupt request. In operating systems other than Windows, such as Linux® and Unix®, upon claiming the interrupt, the device driver ISR does not issue a request for a DPC and instead directly performs the work. The device driver will further write to the device's mask register to disable the device's interrupts to cause the device to deassert the interrupt request line and will separately write the read interrupt status to the device's interrupt status register to acknowledge the device's interrupt. If a device driver ISR responds that the interrupt is not from the device associated with the driver, then the operating system ISR determines a next device driver in a chain of device drivers to poll and sends the request to the next device driver ISR in the chain. The operating system ISR continues polling device driver ISRs in the list until one device driver ISR claims the interrupt and requests DPC resources.

When the device driver ISR reads the device status registers to determine whether the driver's device generated the interrupt, the processor must delay processing until the device register is read and the device driver ISR responds to the polling request. Reading a device status register over an I/O bus may take a relatively significant amount of time, thus increasing the latency of the device driver ISR operations, which in turn reduce processor performance.

For these reasons, there is a need in the art to provide improved techniques for handling device interrupt requests.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Interrupt Polling of Device Drivers

Figure 1:
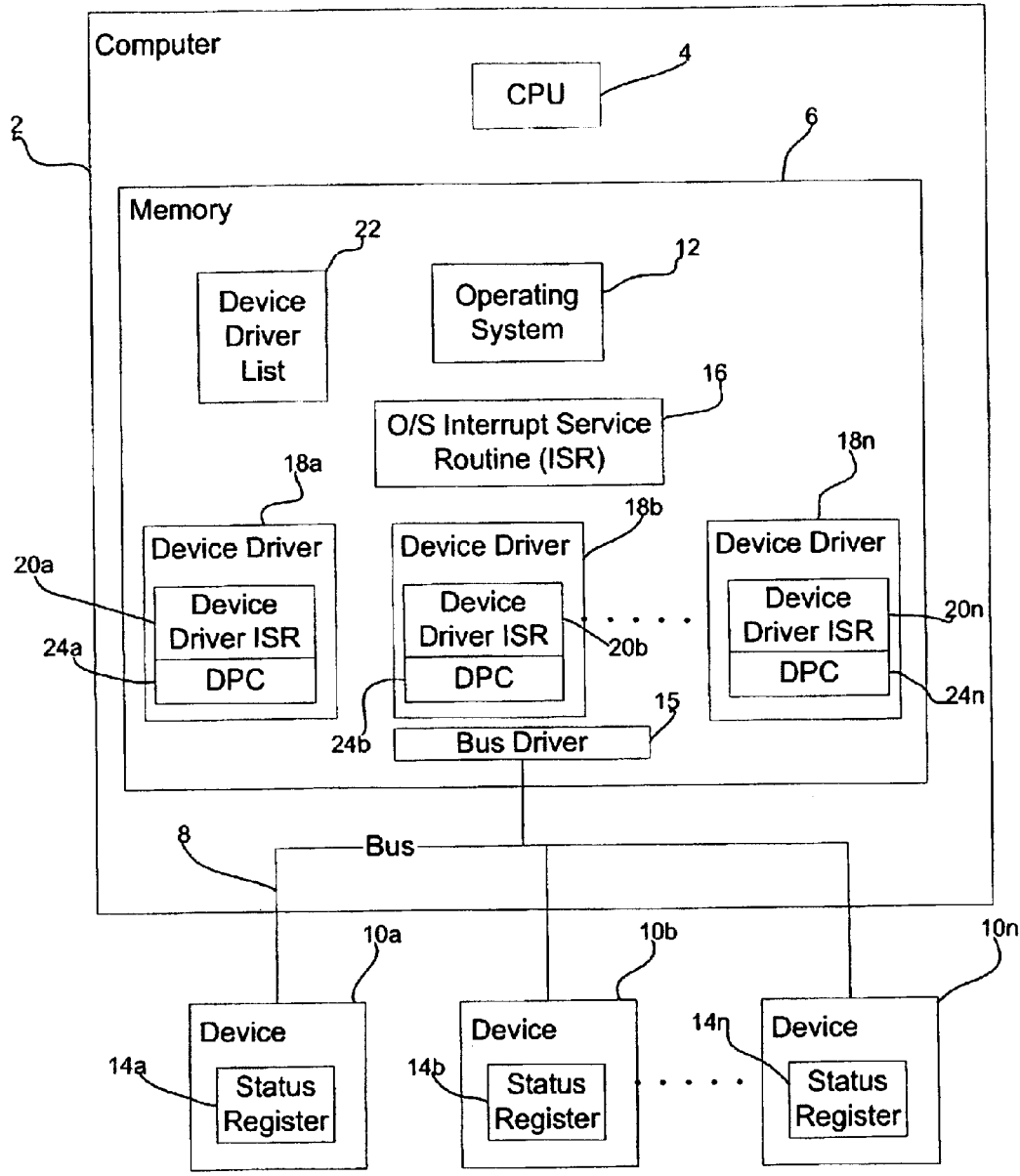
FIG. 1 illustrates a computing environment in which aspects of the invention are implemented.

FIG. 1 illustrates a computing environment in which aspects of the invention may be implemented. A computer 2 includes one or more central processing units (CPUs) 4, a volatile memory 6, a bus interface 8 on which devices communicate data and interrupts to the computer 2. A plurality of devices 10a, 10b . . . 10n communicate data and interrupts to the computer 2 via a bus interface 8. The bus interface 8 may be implemented using any Input/Output (I/O) bus technology known in the art, such as the Peripheral Component Interconnect (PCI), Industry Standard Architecture (ISA), the Video Electronics Standards Association (VESA), Micro Channel Architecture (MCA), Extended ISA, and any other known bus technology known in the art. The devices 10a, 10b . . . 10n may comprise any I/O device known in the art, such as storage devices (e.g., tape drive, hard disk drive, optical disk drive, memory card reader, etc.), network adaptor card, video devices, printers, etc. The devices 10a, 10b . . . 10n include one or more status registers 14a, 14b . . . 14n that indicate, among other things, whether the device has asserted an interrupt on the bus 8. Although FIG. 1 only shows one bus 8, the computer 2 may include multiple busses to enable communication with the devices connected to such additional busses.

The computer 2 further includes an operating system 12, which may comprise any operating system known in the art, such as a Microsoft Windows® operating system, Linux®, a Unix® type operating system, etc. A bus driver 15 comprises a program that provides an interface between the operating system 12 and the bus 8 to enable communication between the operating system 12 and the devices 10a, 10b . . . 10n that communicate on the bus 8. The operating system 12 includes an interrupt service routine (ISR) component 16 that handles interrupt requests received from the devices 10a, 10b . . . 10n transmitted across interrupt lines (not shown) of the bus 8. The operating system 12 further loads into memory 6 and executes one device driver 18a, 18b . . . 18n for each device 10a, 10b . . . 10n recognized by the operating system 12. The device drivers 18a, 18b . . . 18n each include device specific code to enable communication between the operating system 12 and the devices 10a, 10b . . . 10n. The device drivers 18a, 18b . . . 18n each include an interrupt service routine (ISR) 20a, 20b . . . . 20n component to handle interrupt requests from the associated device 10a, 10b . . . 10n. The operating system ISR 16 utilizes a device driver list 22 that identifies all the loaded device drivers 18a, 18b . . . 18n registered with the operating system 12.

Further, in Microsoft® Windows® operating systems, the operating system ISR 16 may assign a deferred procedure call (DPC) 24a, 24b . . . 24n to a device driver 18a, 18b . . . 18n to perform device related work. In non-Windows® operating systems, there is no DPC.

Figure 2:
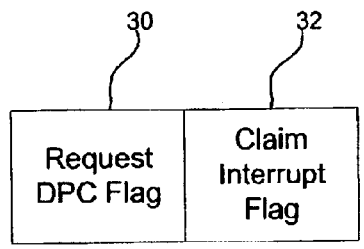
FIG. 2 illustrates flags set by a device driver in response to determining whether the associated device transmitted the interrupt in accordance with described implementations of the invention.

FIG. 2 illustrates data that the device driver ISR 20a, 20b . . . 20n communicates to the operating system ISR 16 in response to an interrupt polling request. A request DPC flag 30 indicates whether the device driver ISR 20a, 20b . . . 20n is requesting a DPC 24a, 24b . . . 24n to handle device interrupt related work. A claim interrupt flag 32 indicates whether the device driver 18a, 18b . . . 18n is claiming the interrupt after determining that the interrupt was generated by the driver's device 10a, 10b . . . 10n.

Figure 3:
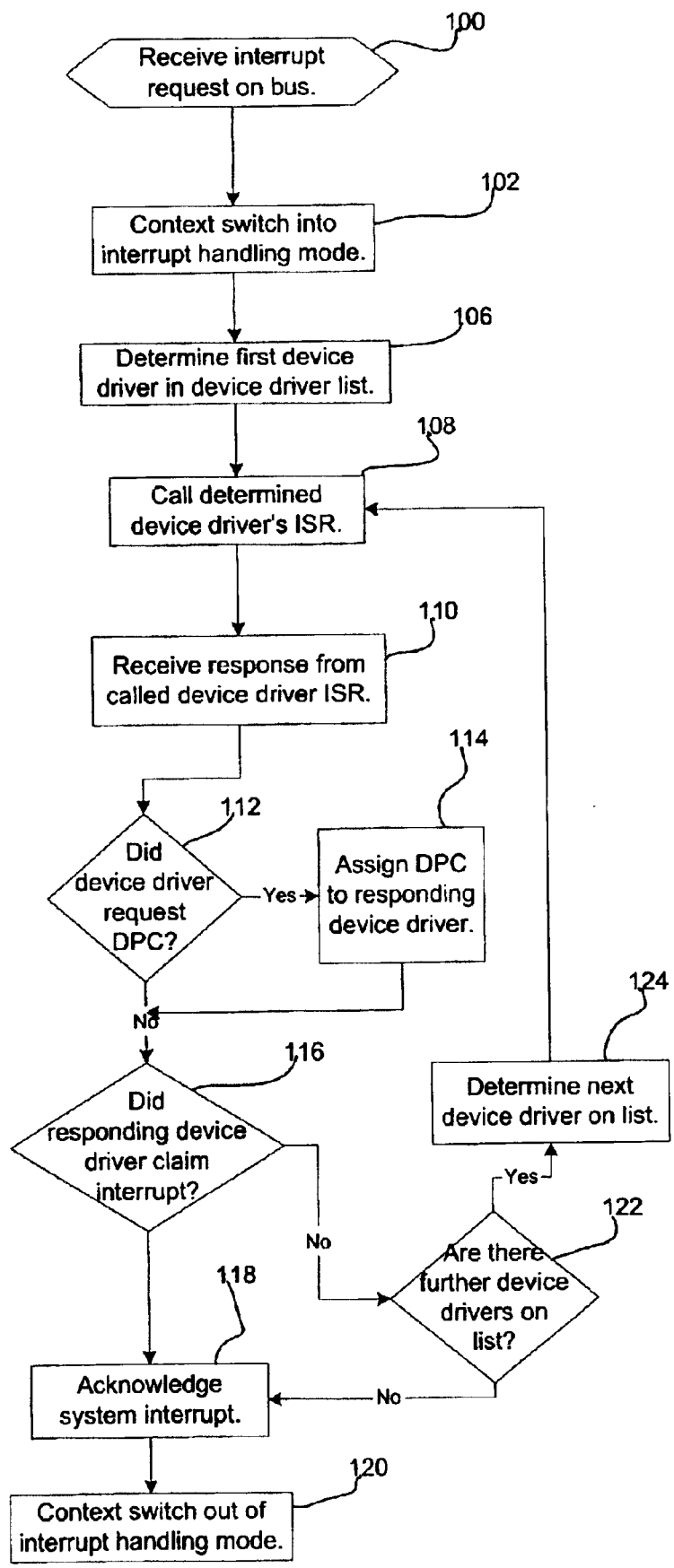
FIG. 3 illustrates operations performed by the operating system to handle an interrupt request in accordance with described implementations of the invention.

FIG. 3 illustrates operations performed by the code of the operating system ISR 16 to handle an interrupt from a device 10a, 10b . . . 10n. Control begins at block 100 with the operating system ISR 16 receiving an interrupt from one device 10a, 10b . . . 10n over the bus 8. In response, the operating system ISR 16 performs (at block 102) a context switch to interrupt handling mode. The operating system ISR 16 then determines (at block 106) from the device driver list 22 the first listed device driver and calls (at block 108) the determined device driver ISR 20a, 20b . . . 20n to poll whether the device managed by the determined device driver 18a, 18b . . . 18n initiated the interrupt. Control then proceeds to block 150 in FIG. 4.

Figure 4:
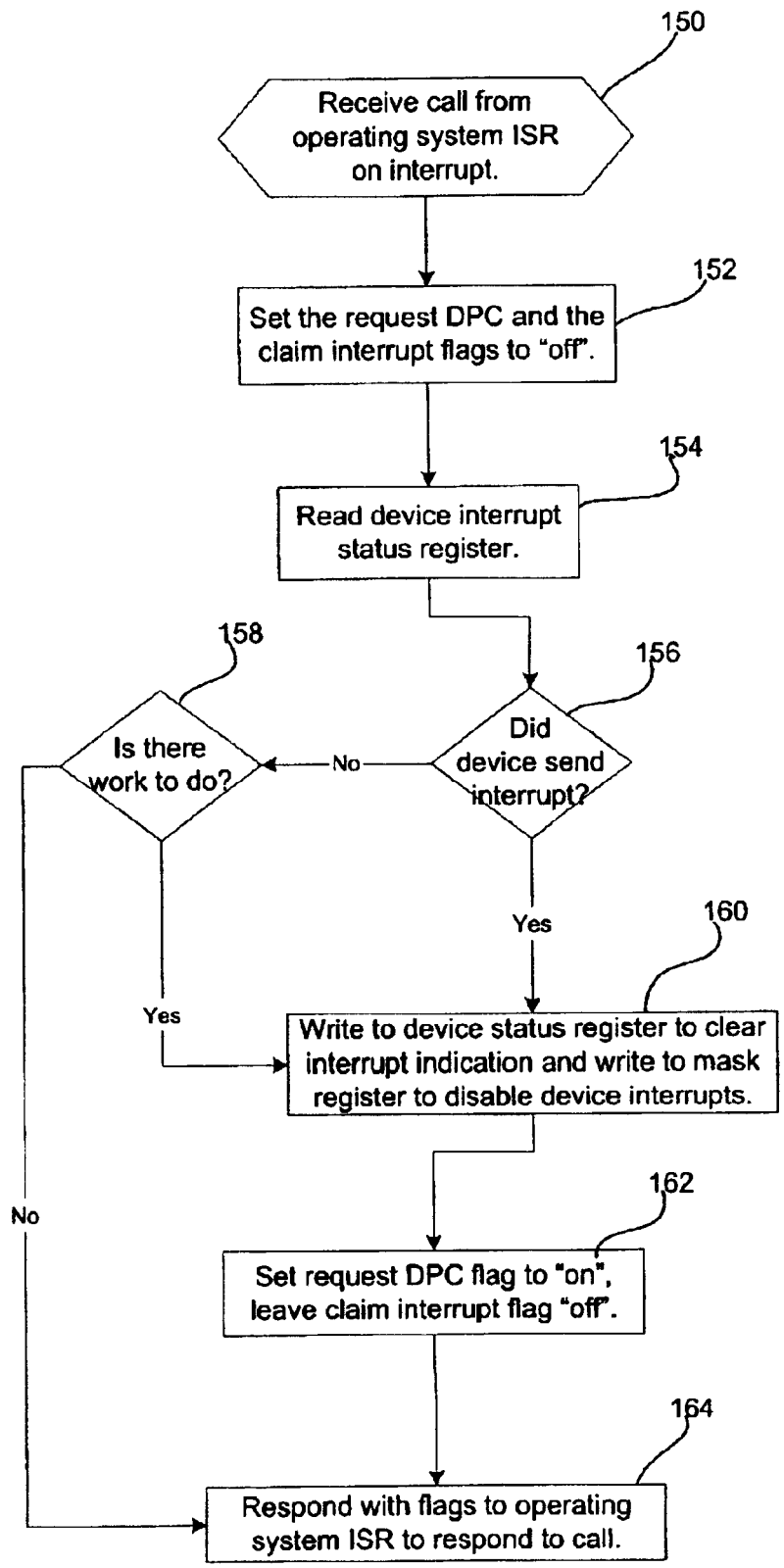
FIG. 4 illustrates operations performed by the device driver to handle an interrupt request in accordance with described implementations of the invention.

FIG. 4 illustrates operations performed by code of the device driver ISRs 20a, 20b . . . 20n in response to receiving (at block 150) the call from the operating system ISR 16 generated at block 108. In response, the device driver ISR 20a, 20b . . . 20n sets (at block 152) the request DPC 30 and the claim interrupt 32 flags (FIG. 2) to "off". The called device driver ISR 20a, 20b . . . 20n then issues (at block 154) a read request over the bus 8 to read the device interrupt status register 14a, 14b . . . 14n of the driver's device 10a, 10b . . . 10n. If the read status register 14a, 14b . . . n indicates (at block 156) that the driver's device 10a, 10b . . . 10n submitted an interrupt request, then the called device driver ISR 20a, 20b . . . 20n writes (at block 160) to the device status register 14a, 14b . . . 14n to clear the interrupt and writes to the mask register to disable the interrupt. Disabling the interrupt by writing to the mask register prevents the device 10a, 10b . . . 10n from generating any further interrupts. The device driver ISR 20a, 20b . . . 20n then sets (at block 162) the request DPC flag 30 to "on" and leaves the claim interrupt flag 32 (FIG. 2) "off" and responds (at block 164) with the flags 30 and 32 to the operating system ISR 16 that called the device driver ISR 20a, 20b . . . 20n.

If (at block 156) the device 10a, 10b . . . 10n did not send an interrupt, then the device driver ISR 20a, 20b . . . 20n determines (at block 158) whether there is work to do not necessarily related to an interrupt. The work that is determined may or may not relate to a device interrupt. For instance, the device driver ISR 20a, 20b . . . 20n may read descriptors of packets to determine whether the device 10a, 10b . . . 10n may soon send an interrupt. Additionally, to determine whether there is available work to perform, the device driver ISR 20a, 20b . . . 20n may read a register that counts a number of packets, where the number of packets may indicate that there is work to perform. Other techniques may be used to anticipate any work that may be performed in the near future which will require DPC resources. In this way, the device driver ISR 20a, 20b . . . 20n submits a request for a DPC resource as part of an opportunistic search for anticipated work or interrupts that are likely to be generated. Implementations that require DPC resources concern the Microsoft® Windows® operating system. However, certain non-Windows operating systems do not utilize DPCs, and in such systems, the device driver ISR 20a, 20b . . . 20n performs the work itself without requesting a DPC. In such non-Windows implementations, the device driver ISR may respond by not claiming the interrupt and then proceeding to perform the work.

This opportunistic determination saves resources because an interrupt message is avoided by handling the work before the interrupt is requested. Further, the described implementations conserve operating system resources because a context switch to interrupt handling mode is avoided. If (at block 158) there is no anticipated work, control proceeds to block 164 to transmit the flags 30, 32 (FIG. 2) that are both set in the "off" state.

With respect to FIG. 3, the operating system ISR 16, upon receiving (at block 110) the response from the device driver ISR 20a, 20b . . . 20n, determines (at block 112) whether the DPC request flag 30 is "on", indicating the device driver ISR 20a, 20b . . . 20n is requesting a DPC. If so, the operating system ISR 16 assigns (at block 114) DPC resources 24a, 24b . . . 24n to the responding device driver ISR 20a, 20b . . . 20n. From the no branch of block 112 or block 114, control proceeds to block 116 where the operating system ISR 16 determines whether the responding device driver ISR 20a, 20b . . . 20n claimed the interrupt, i.e., whether the claim interrupt flag 32 (FIG. 2) is "on". If so, then the operating system ISR 16 acknowledges (at block 118) the system interrupt and then context switches (at block 120) out of the interrupt handling mode. If (at block 116) the responding device driver ISR 20a, 20b . . . 20n did not claim the interrupt and if (at block 122) there are further device drivers 18a, 18b . . . 18n not yet checked on the device driver list 22, then the next device driver on the list 22 is determined (at block 124) and control proceeds to block 108 to call that next determined device driver ISR 20a, 20b . . . 20n to check whether the device managed by that next determined device driver ISR 20a, 20b . . . 20n initiated the interrupt. If (at block 122) there are no further device drivers on the list 22, then control proceeds to block 118 to end the interrupt handling.

With the described implementations, the device driver ISRs 20a, 20b . . . 20n claim an interrupt by requesting a DPC 24a, 24b . . . 24n, but not formally claiming the interrupt to the operating system ISR 16. This causes the operating system ISR 16 to assign the claiming device driver ISR 20a, 20b . . . 20n sufficient DPC 24a, 24b . . . 24n resources to service the interrupt. However, because the interrupt was not claimed, the operating system ISR 16 continues to check device drivers in the list 22, thereby allowing the operating system ISR 16 to handle a subsequent interrupt request for a device driver 10a, 10b . . . 10n lower down the list 22 without having to utilize processor resources to context switch to interrupt handling mode. Further, with the described implementations, the device driver ISR 20a, 20b . . . 20n may anticipate work to perform and request DPC resources 24a, 24b . . . 24n even when the driver's device did not initiate the interrupt in order to handle an anticipated interrupt request from the device 10a, 10b . . . 10n in a manner that relieves the operating system ISR 16 of the burden of having to handle the interrupt, thereby further conserving operating system resources.

Maintaining Device Interrupt Status Registers in Local Memory

Figure 5:
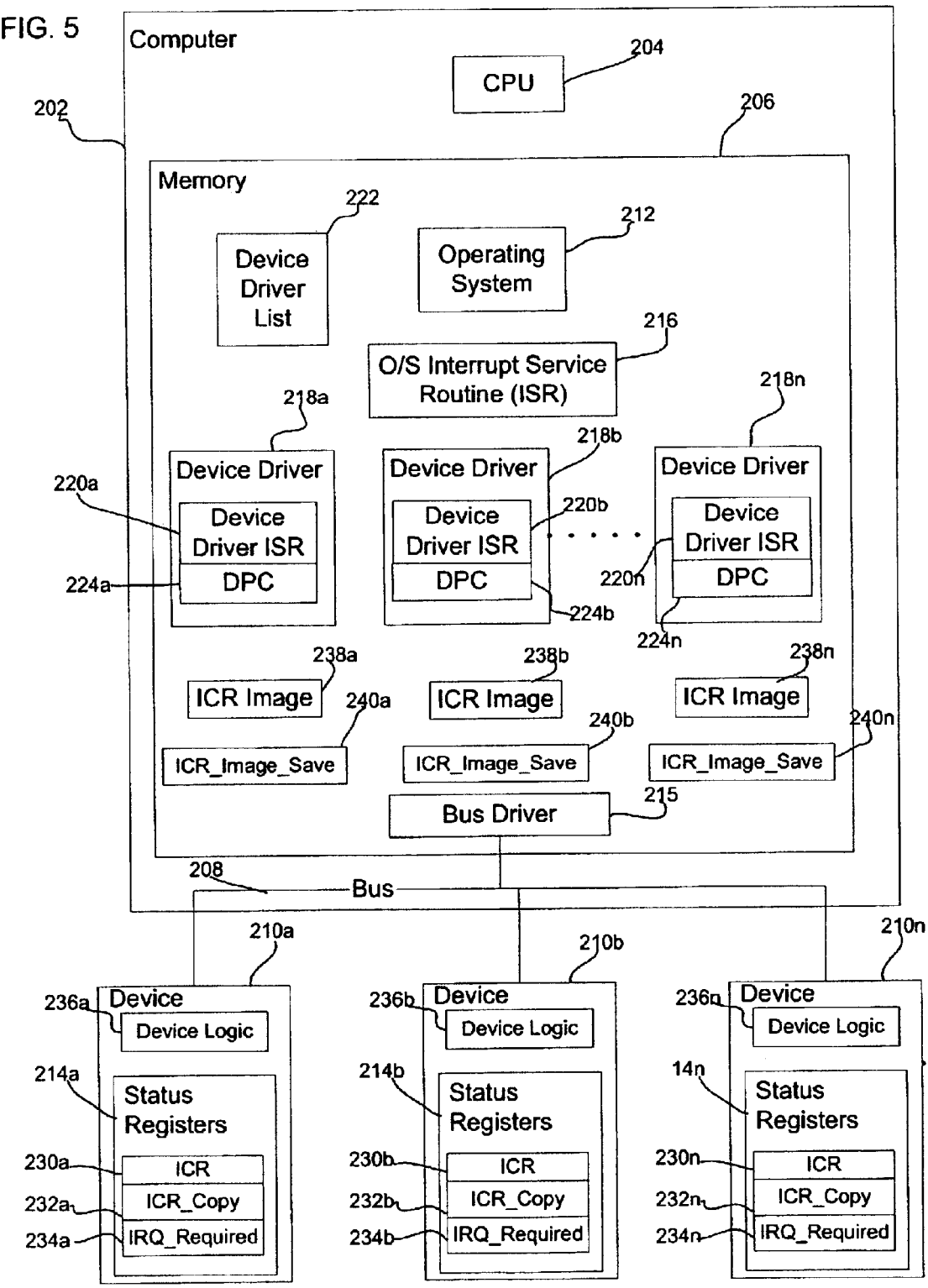
FIG. 5 illustrates an alternative computing environment in which further aspects of the invention are implemented.

FIG. 5 illustrates an alternative implementation of the computing environment of FIG. 1. In FIG. 5, a computer 202 includes one or more central processing units (CPU) 204, a volatile memory 206, a bus interface 208 on which devices communicate data and interrupts to the computer 202. A plurality of devices 210a, 210b . . . 210n communicate data and interrupts to the computer 202 via the bus 208. The bus 208 may be implemented using any Input/Output (I/O) bus technology known in the art, such as the Peripheral Component Interconnect (PCI), Industry Standard Architecture (ISA), the Video Electronics Standards Association (VESA), Micro Channel Architecture (MCA), Extended ISA, and any other known bus technology known in the art. The devices 210a, 210b . . . 210n may comprise any I/O device known in the art, such as storage devices (e.g., tape drive, hard disk drive, optical disk drive, memory card reader, etc.), network adaptor card, video devices, printers, etc. The devices 210a, 210b . . . 210n include one or more status registers 214a, 214b . . . 214n that indicate, among other things, whether the device has asserted an interrupt on the bus 208. Although FIG. 5 only shows one bus 208, the computer 202 may include multiple busses to enable communication with the devices connected to such additional busses.

The computer 202 further includes an operating system 212, which may comprise any operating system known in the art, such as a Microsoft Windows® operating system, Linux®, a Unix® type operating system, etc. A bus driver 215 comprises a program that provides an interface between the operating system 212 and the bus 208 to enable communication between the operating system 212 and the devices 210a, 210b . . . 210n that communicate on the bus 208. The operating system 212 includes an interrupt service routine (ISR) component 216 that handles interrupt requests received from the devices 210a, 210b . . . 210n transmitted across an interrupt line (not shown) of the bus 208 or transmitted using an interrupt message, such as a Message Signaled Interrupt (MSI). The operating system 212 further loads into memory 206 and executes one device driver 218a, 218b . . . 218n for each device 210a, 210b . . . 210n recognized by the operating system 212. The device drivers 218a, 218b . . . 218n include device specific code to enable communication between the operating system 212 and the devices 210a, 210b . . . 210n. The device drivers 218a, 218b . . . 218n each include an interrupt service routine (ISR) 220a, 220b . . . 220n component to handle interrupt requests from the associated device 210a, 210b . . . 210n. The operating system ISR 216 utilizes a device driver list 222 that identifies all the loaded device drivers 218a, 218b . . . 218n registered with the operating system 212. Further, as discussed, in Microsoft® Windows® operating systems, the operating system ISR 216 may assign a deferred procedure call (DPC) 224a, 224b . . . 224n to a device driver 218a, 218b . . . 218n to perform device related work. In non-Windows® operating systems, there is no DPC.

The device status registers 214a, 214b . . . 214n may each include the following information:
Interrupt Cause/Status Registers (ICR) 230a, 230b . . . 230n: provides interrupt status information, such as whether an interrupt is pending, a priority of a pending interrupt, etc.
ICR_Copy 232a, 232b . . . 232n: a copy of the ICR 230a, 230b . . . 230n value used during operations.
IRQ_Required 234a, 234b . . . 234n: flag indicates whether an interrupt request (IRQ) signal needs to be sent to the operating system 212 to notify the operating system 212 of a read/write request to be sent.

Figure 6:
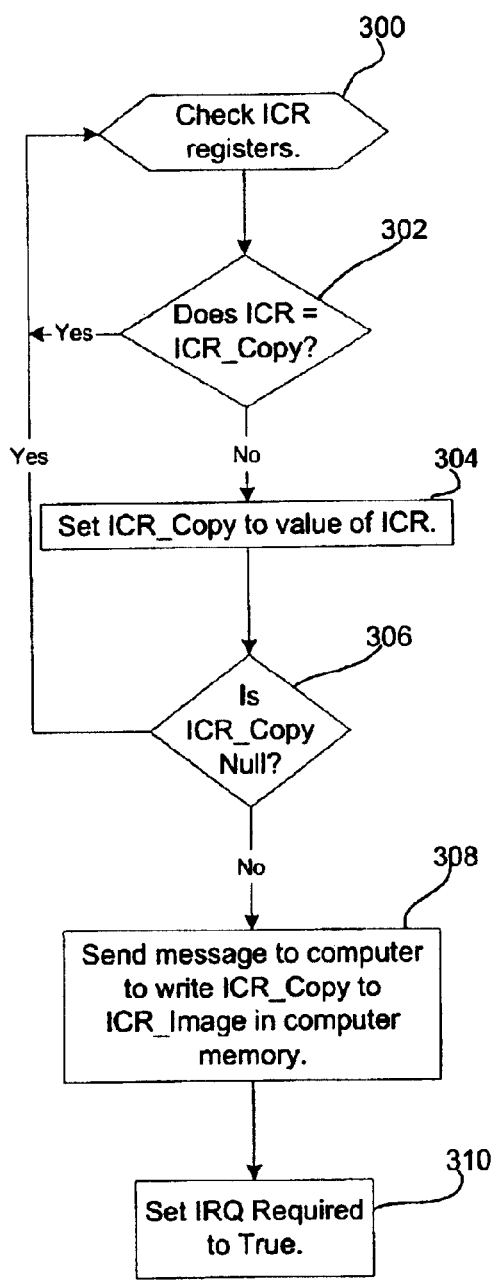
FIGS. 6 and 7 illustrate operations performed in a device to generate an interrupt signal in accordance with implementations of the invention.
Figure 7:
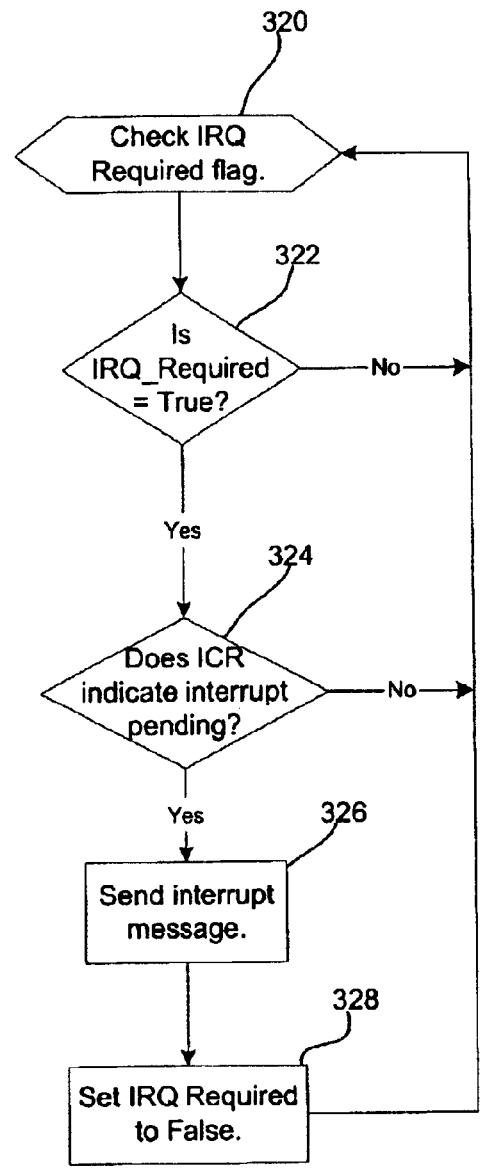

FIGS. 6 and 7 illustrates operations performed by device logic 236a, 236b . . . 236n implemented in each device 210a, 210b . . . 210n to signal the operating system 212 of interrupts in accordance with implementations of the invention. Control begins at block 300 with the device logic 236a, 236b . . . 236n checking ICR status registers 214a, 214b . . . 214n. This checking operation at block 300 may be initiated at periodic intervals or in response to a change in one of the ICR 230a, 230b . . . 230n registers. If the ICR 230a, 230b . . . 230n value is equal to the ICR_Copy 232a, 232b . . . 232n value, then there has been no change to the interrupt status at the device and control proceeds back to block 300. Otherwise, if there has been a change to the interrupt status as indicated by the difference between the ICR 230a, 230b . . . 230n value and ICR_Copy 232a, 232b . . . 232n value, then the ICR_Copy 232a, 232b . . . 232n is set (at block 304) to the value of the ICR 230a, 230b . . . 230n register. If (at block 306), the ICR_Copy 232a, 232b . . . 232n value is null, or some other value indicating that there is no pending interrupt at the device 210a, 210b . . . 210n, then control proceeds back to block 300 to periodic interrupt checking. Otherwise, if (at block 306) the ICR_Copy 232a, 232b . . . 232n value indicates that an interrupt is pending, then the device logic 236a, 236b . . . 236n sends (at block 308) a message to the operating system 212 over the bus 208 to write the ICR_Copy 232a, 232b . . . 232n value to the ICR_Image 238a, 238b . . . 238n value in the computer memory 206. As mentioned, an ICR_Image 238a, 238b . . . 238n and ICR_Image_Save 240a, 240b . . . 240n values are maintained in the computer memory 206 for each initialized device 210a, 210b . . . 210n. The IRQ_Required flag 234a, 234b . . . 234n is then set (at block 310) to "true", indicating that an interrupt needs to be sent to the operating system 212. The result of the operations of FIG. 6 is that the ICR 230a, 230b . . . 230n register value at the device 210a, 210b . . . 210n in the interrupt state is copied to the computer memory 206 for use by the device driver 218a, 218b . . . 218n when handling the device interrupt. This allows the device driver 218a, 218b . . . 218n to access the ICR status information from local memory 206 using a local memory bus (not shown) and avoid having to read the device status registers 214a, 214b . . . 214n over the bus 208. In further implementations, the device may transmit information in addition to the described ICR register values to store in local memory 206 to relieve the device driver ISR from having to consume resources to read such additional information from the devices.

With respect to FIG. 7, control begins at block 320 with the device logic 236a, 236b . . . 236n periodically checking the IRQ_Required flag 234a, 234b . . . 234n. If (at block 322) the IRQ_Required flag 234a, 234b . . . 234n is "true" and if (at block 324) the ICR 230a, 230b . . . 230n indicates that an interrupt is pending, then the device logic 236a, 236b . . . 236n sends (at block 326) an interrupt message, which may include additional information and status, to the operating system 212 over the bus 208 and sets (at block 328) the IRQ_Required flag 234a, 234b . . . 234n to "false".

In certain implementations, the message sent at block 326 may comprise a Message Signaled Interrupt (MSI) as described in Section 6.8 of the "PCI Local Bus Specification", Rev. 2.3, published by the PCI Special Interest Group (Mar. 29, 2002), which publication is incorporated herein by reference in its entirety. In MSI messaging, the device 210a, 210b . . . 210n sends a unique vector via a write transaction to a system address. The device 210a, 210b . . . 210n would encode the message with a unique address that the operating system 212 had assigned to the device 210a, 210b . . . 210n during initialization to enable the operating system 212 to distinguish which device 210a, 210b . . . 210n initiated the message. Alternative techniques known in the art for signaling the interrupt may be used.

Figure 8:
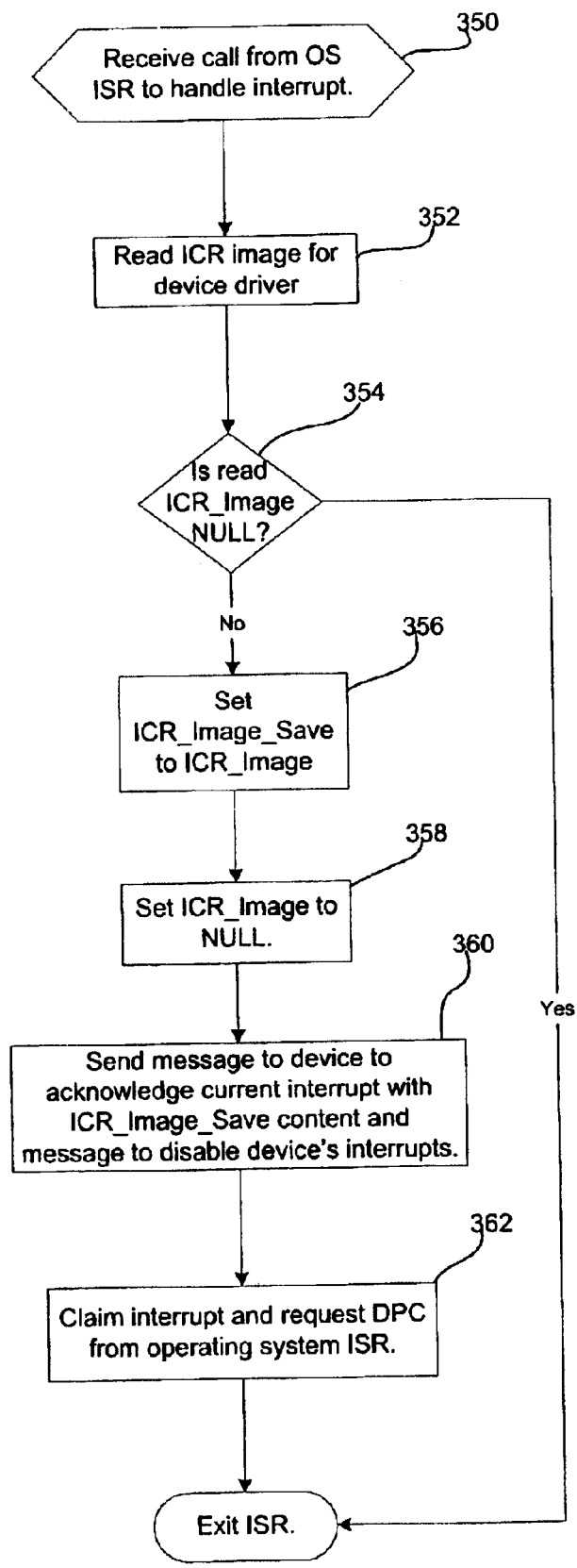
FIGS. 8, 9 and 11 illustrate operations performed by the device driver to handle an interrupt request in accordance with described implementations of the invention.

FIG. 8 illustrates operations performed by the device driver ISR 220a, 220b . . . 220n in accordance with implementations of the invention. Control begins at block 350 with the device driver ISR 220a, 220b . . . 220n receiving a call from the operating system ISR 216 to handle an interrupt for the driver's device 210a, 210b . . . 210n. In certain MSI implementations, the operating system 212 can determine the device driver 218a, 218b . . . 218n that initiated the interrupt because the operating system 212 associates a unique address with each device 210a, 210b . . . 210n. In alternative implementations, such as those where an interrupt signal is generated on the bus 208 to a non-unique interrupt line, the operating system ISR 216 may poll each device driver 218a, 218b . . . 218n to determine the driver for the device 210a, 210b . . . 210n that initiated the interrupt. After being called to handle the interrupt, the device driver ISR 220a, 220b . . . 220n reads (at block 352) its ICR_Image 238a, 238b . . . 238n value from local memory 206. If (at block 354) the driver's ICR_Image 238a, 238b . . . 238n value is null, or otherwise indicates that there is no pending interrupt for the device 10a, 10b . . . 10n, then control ends because the called driver's device did not initiate the interrupt. Otherwise, if the ICR_Image 238a, 238b . . . 238n is not null, and indicates a pending interrupt, then the device driver ISR 220a, 220b . . . 220n sets (at block 356) the ICR_Image_Save 240a, 240b . . . 240n value to the read ICR_Image 238a, 238b . . . 238n value and sets (at block 358) the ICR_Image 238a, 238b . . . 238n value to NULL to indicate that there is no longer a pending interrupt that needs to be serviced.

The device driver ISR 220a, 220b . . . 220n then sends (at block 360) a message to the driver's device 210a, 210b . . . 210n over the bus 208 to acknowledge the current interrupt with the ICR_Image_Save 240a, 240b . . . 240n value and a message for the device 210a, 210b . . . 210n to disable certain of the device's interrupts, such as those indicated in the ICR 230a, 230b . . . 230n register. This acknowledgment message may include the ICR status read from the ICR_Image_Save 240a, 240b . . . 240n value in local memory 206, which causes the device 210a, 210b . . . 210n to deassert the interrupt request line. The device driver ISR 220a, 220b . . . 220n then claims (at block 362) the interrupt and requests a DPC from the operating system ISR 216 to process the interrupt request and exits.

Figure 9:
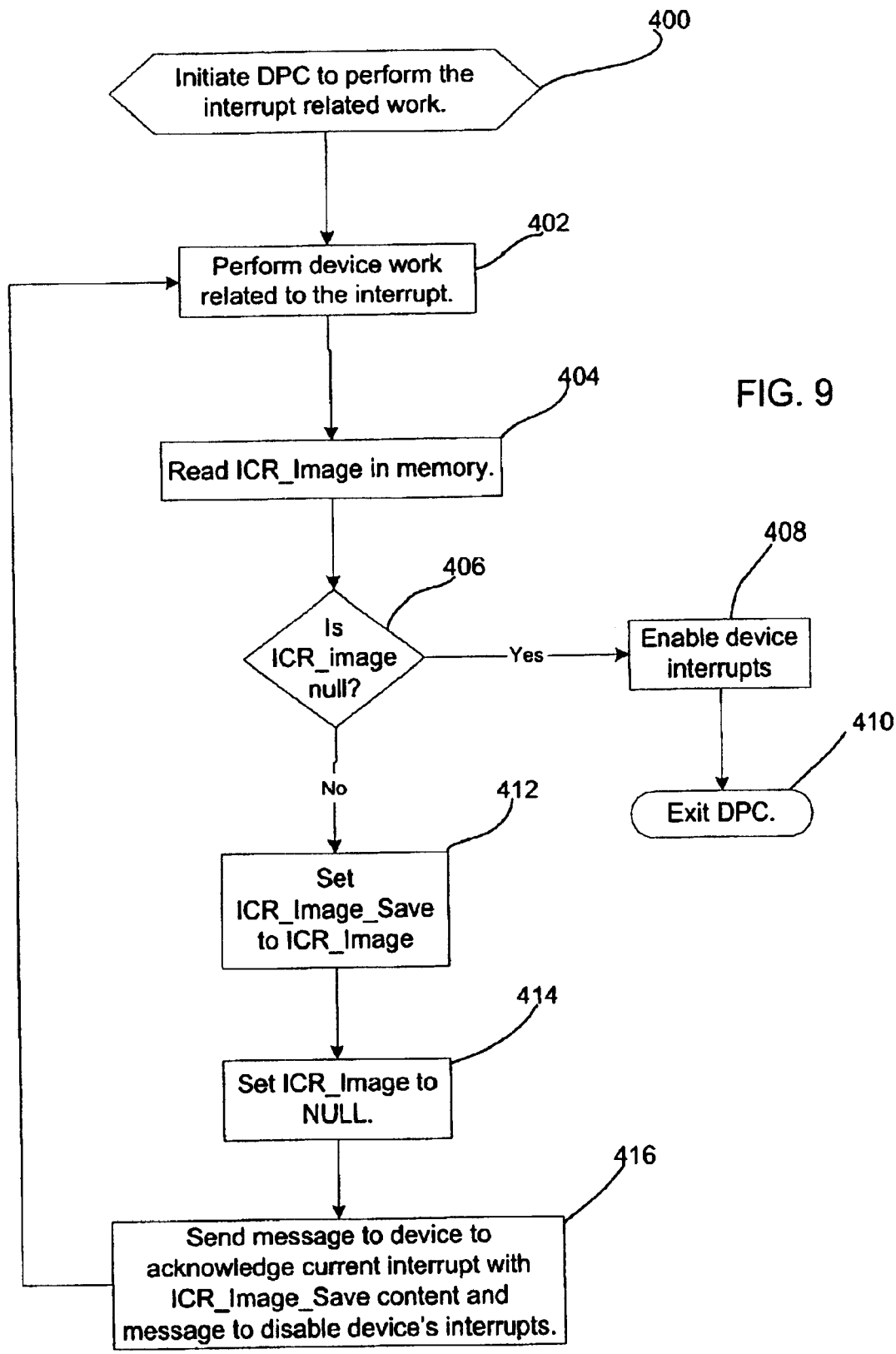

FIG. 9 illustrates operations the DPC 224a, 224b . . . 224n requested by the device driver ISR 220a, 220b . . . 220n performs to handle the interrupt. Upon initiating (at block 400) the process to invoke the DPC 224a, 224b . . . 224n to handle the interrupt, the DPC 224a, 224b . . . 224n performs (at block 402) device work related to the interrupt. For instance, if the device 210a, 210b . . . 210n comprises a network adaptor, such as an Ethernet adaptor, then the device related work performed by the DPC 224a, 224b . . . 224n may include processing receive and transmit buffers and performing link level error correction processing. After processing the interrupt, the device driver DPC 224a, 224b . . . 224n reads (at block 404) the ICR_Image 238a, 238b . . . 238n value in local memory 206 to determine whether the device 210a, 210b . . . 210n has initiated a subsequent interrupt, which would have been indicated by the device writing (at block 308 in FIG. 6) a new ICR register value to the local memory copy of the ICR value in the ICR_Image 238a, 238b . . . 238n while the device driver ISR 220a, 220b . . . 220n or device driver DPC 224a, 224b . . . 224n is processing the current interrupt. If (at block 406) the ICR_Image 238a, 238b . . . 238n is null, or otherwise indicates that no new interrupt has been received, then the device driver DPC 224a, 224b . . . 224n enables (at block 408) the device 210a, 210b . . . 210n interrupts by writing the appropriate data over the bus 208 and then exits (at block 410) the DPC 224a, 224b . . . 224n.

If (at block 406) the ICR_Image 238a, 238b . . . 238n value is not null, nor otherwise indicates that a new interrupt has been received, then the device driver ISR 220a, 220b . . . 220n sets (at block 412) the ICR_Image_Save 240a, 240b . . . 240n value to the ICR_Image 238a, 238b . . . 238n value and then sets (at block 414) the ICR_Image 238a, 238b . . . 238n value to NULL to indicate that the interrupt has been handled. The device driver ISR 220a, 220b . . . 220n then sends (at block 416) a message to the driver's device 210a, 210b . . . 210n over the bus 208 to acknowledge the current interrupt and to disable the device's interrupts in the manner described above with respect to block 360 in FIG. 8. The described logic of FIG. 9 has the device driver DPC 224a, 224b . . . 224n check whether a subsequent interrupt has arrived by the copy of the interrupt information from the local memory 206. In this way, the device driver 224a, 224b . . . 224n avoids having to read the ICR register value from the device 210a, 210b . . . 210n over the bus 208, which takes significantly longer.

The described implementations thus reduce the time for the device driver ISR 220a, 220b . . . 220n or DPC 224a, 224b . . . 224n to handle an interrupt by having the device driver ISR 220a, 220b . . . 220n or DPC 224a, 224b . . . 224n access ICR status and other information from local memory 206, instead of having to read ICR status information over the bus 208 from the device status registers 214a, 214b . . . 214n. This improved performance of the device driver ISR 220a, 220b . . . 220n or DPC 224a, 224b . . . 224n further improves the general CPU 204 processing performance by minimizing interrupt handling delays.

In certain implementations, the device driver 220a, 220b . . . 220n or DPC 224a, 224b . . . 224n when acknowledging the interrupt and disabling the device's interrupts, such as performed at block 360 in FIG. 8 and block 420 in FIG. 9, may issue two separate write transactions, one to write the ICR value to the ICR 230a, 230b . . . 230n register of the device 210a, 210b . . . 210n to cause the device to deassert the interrupt request line and issue a second write to the interrupt mask register to disable the device interrupts.

Figure 10:
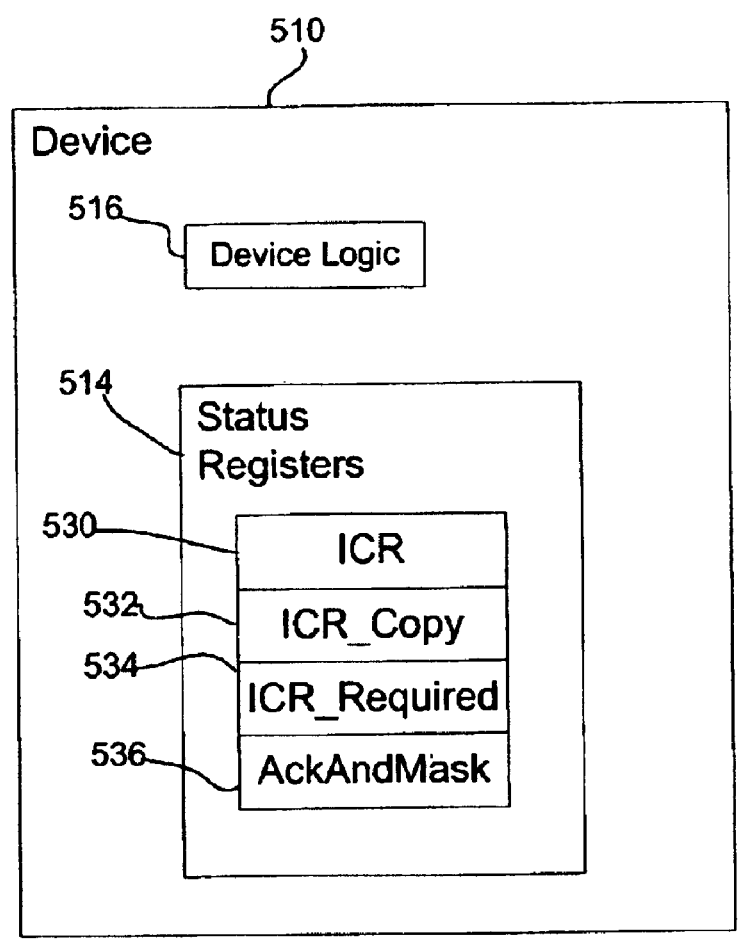
FIG. 10 illustrates an alternative implementation of the device and status registers in accordance with described implementations of the invention.

FIG. 10 illustrates an implementation of a device's 510 status registers 514 as including the ICR 530, ICR_Copy 532, and IRQ_Required 534a, 534b . . . 534n registers such as described above with respect to registers 230a, 230b . . . 230n, 232a, 232b . . . 232n, and 234a, 234b . . . 234n in FIG. 5. The status registers 514 of FIG. 10 further includes a single acknowledgment and mask (AckAndMask) register 536 to indicate in a single register whether an interrupt was acknowledged and whether the interrupts are disabled. In certain implementations, such as at block 360 in FIG. 8 and block 420 in FIG. 9, the device driver ISR 220a, 220b . . . 220n or DPC 224a, 224b . . . 224n may issue a single write request to the AckAndMask register 536 to the ICR_Image_Save 240a, 240b . . . 240n, which is the status value, to both acknowledge the interrupt and to disable the device's interrupts. By consolidating the acknowledgment and disable interrupts in a single write message, both CPU utilization 204 and bus 208 (FIG. 4) bandwidth are conserved and optimized.

In implementations, where the device transmits an interrupt message using a shared interrupt line, the operating system must poll each device driver, such as described above with respect to FIG. 3, to determine the device driver of the device that initiated the request.

Figure 11:
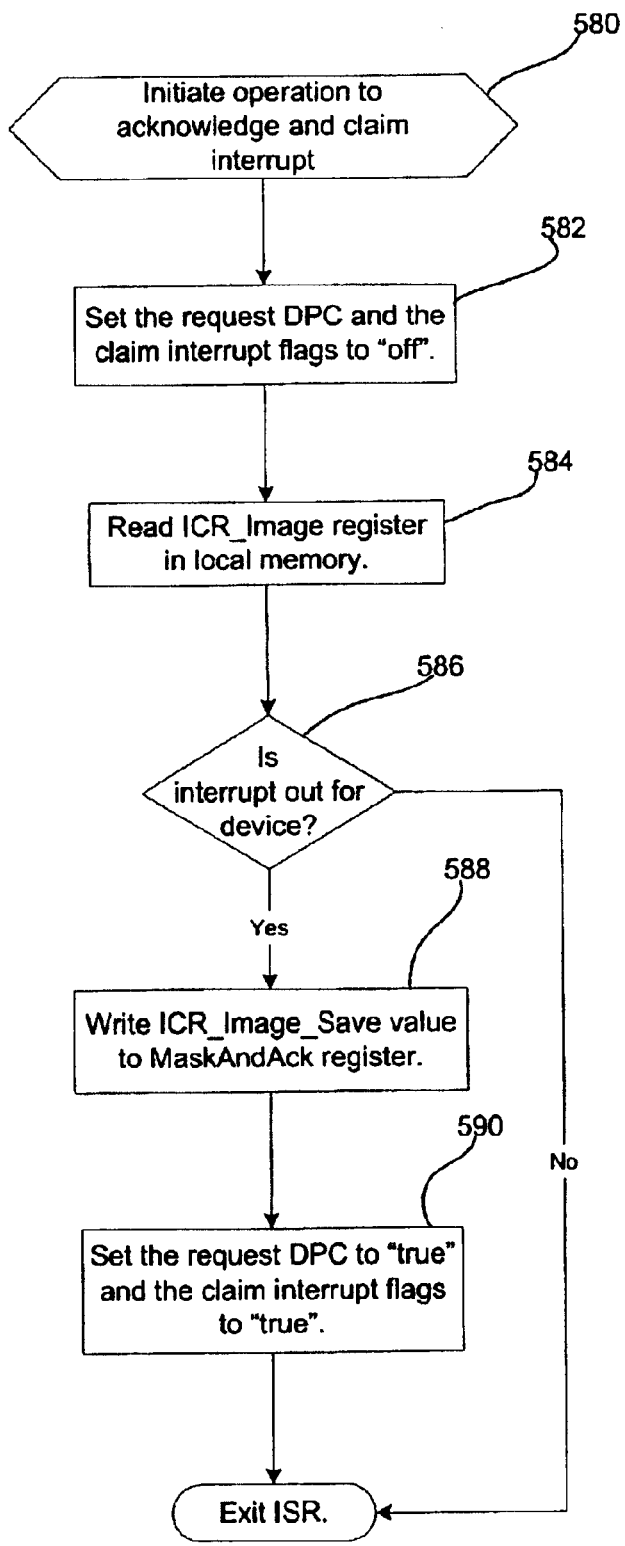

FIG. 11 illustrates logic implemented in the device driver ISRs 220a, 220b . . . 220n to claim an interrupt and request DPC resources to handle the interrupt processing in accordance with described implementations. The operations of FIG. 11 may be initiated in response to a call from the operating system ISR 216 polling the device drivers 218a, 218b . . . 218n to determine the driver associated with the device 210a, 210b . . . 210n that initiated the request. Upon being invoked (at block 580), the device driver ISR 220a, 220b . . . 220n sets (at block 582) the request DPC 30 and the claim interrupt 32 flags (FIG. 2) to "off". The called device driver ISR 220a, 220b . . . 220n then reads (at block 584) the ICR_Image 238a, 238b . . . 238n value from local memory 206 to read the current ICR status information of the driver's device 20a, 20b . . . 20n. If the read ICR_Image 238a, 238b . . . 238n indicates (at block 586) that the driver's device 210a, 210b . . . 210n submitted an interrupt request, then the called device driver ISR 220a, 220b . . . 220n writes (at block 588) the read ICR value from local memory to the device's AckAndMask register 536 over the bus 208 to disable and clear the interrupt indicator so that the device mask status register no longer indicates that an interrupt was sent. As discussed, writing to the AckAndMask register 536 both acknowledges the interrupt and disables the device's interrupts with a single write. The device driver ISR 220a, 220b . . . 220n then sets (at block 590) the request DPC flag 30 and claim interrupt flag 32 (FIG. 2) to "on" and exits. The operating system ISR 216 upon detecting the value of these flags, would then stop polling the device drivers because the currently polled device driver 218a, 218b . . . 218n claimed the interrupt and would assign a DPC 224a, 224b . . . 224n resource to the acknowledging device driver 218a, 218b . . . 218n to handle the interrupt. In additional implementations, at block 590, the device driver ISR 220a, 220b . . . 220 may implement the logic of FIG. 4 to set the claim interrupt 32 flag (FIG. 2) to "off" to allow the operating system ISR 216 to continue to poll device driver ISRs 220a, 220b . . . 220n in the manner discussed above with respect to FIGS. 3 and 4 to improve interrupt handling performance.

Described implementations provide improved techniques for handling interrupts by having the device write interrupt status information to local memory where the information is available to the device driver. This allows the device driver to access the information locally and avoid having to read the data from the device's registers over a bus.

Additional Embodiment Details

The described techniques for handling device interrupts may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, the bus interrupt handling implementations are included in a computer to handle interrupts from devices coupled to the bus enabling communication with the computer. In alternative implementations, the bus interrupt handling implementations may be implemented in any type of electronic device communicating with other devices, such as a hand held computer, a palm top computer, a laptop computer, a network switch or router, a telephony device, a network appliance, a wireless device, etc.

In the described embodiments, certain operations were described as being performed by the operating system ISR and device driver. In alterative embodiments, operations described as performed by the operating system ISR may be performed by the device driver ISR, and vice versa.

In the described implementations, the devices communicated an interrupt signal for an I/O request over an interrupt line of the bus. In alternative implementations, the devices may signal an interrupt in a different manner than through a bus interrupt signal.

FIGS. 1, 5, and 10 illustrate certain information maintained in registers within the device and computer memory. In alternative implementations, additional or different types of information may be maintained.

The illustrated operations of FIGS. 3, 4, 6, 7, 8, 9, and 11 show certain events occurring in a certain order. In alternative embodiments, certain operations may be performed in a different order, modified or removed. Morever, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method performed by a device for transmitting an interrupt signal to a computer including a memory, comprising:
   determining whether a new interrupt is pending at the device for an Input/Output (I/O) request;
   transmitting interrupt status information to the computer to write to the computer memory if the new interrupt is pending;
   if the new interrupt is pending, transmitting an interrupt signal to the computer to cause the computer to use the interrupt status information written to the computer memory to handle the new interrupt and the I/O request associated with the new interrupt; and
   receiving a request to write to a register, wherein the write to the register acknowledges the new interrupt and disables interrupts at the device.

2. A method for transmitting an interrupt signal to a computer including a memory, comprising:
   determining whether a new interrupt is pending for an Input/Output (I/O) request by determining whether a first interrupt status register content equals a second interrupt status register content, wherein if the first and second interrupt status register contents are equal, then the new interrupt is not pending, and wherein if the first and second interrupt status register contents are not equal, then the new interrupt is pending;
   transmitting interrupt status information to the computer to write to the computer memory if the new interrupt is pending; and
   if the new interrupt is pending, transmitting an interrupt signal to the computer to cause the computer to use the interrupt status information written to the computer memory to handle the new interrupt and the I/O request associated with the new interrupt.

3. The method of claim 2, further comprising:
   setting the second interrupt status register content to the first interrupt status register content if the first and second interrupt status register contents are not equal.

4. The method of claim 2, further comprising:
   setting an interrupt request flag to indicate to transmit the interrupt signal if the new interrupt is pending, wherein the interrupt signal is transmitted if the interrupt request flag is set to indicate to transmit the interrupt signal.

5. A method implemented by a device driver executing in a computer including an operating system for handling interrupts from an associated device, wherein the device driver is capable of interfacing with the associated device, and wherein the device driver performs:
   receiving a call requesting whether an interrupt received from a device is from the associated device;
   reading interrupt status information in memory within the computer to determine whether the associated device transmitted the interrupt, wherein the associated device writes the interrupt status information to the memory; and
   if the associated device transmitted the interrupt, then requesting resources from the operating system to handle the interrupt.

6. The method of claim 5, further comprising:
   claiming the interrupt if the associated device transmitted the interrupt.

7. The method of claim 5, further comprising:
   if the associated device transmitted the interrupt, then indicating that the associated device did not transmit the interrupt.

8. The method of claim 5, further comprising:
   sending at least one message to the device to acknowledge the interrupt and disable the associated device's interrupts.

9. The method of claim 8, wherein sending the at least one message comprises sending a single message to acknowledge the interrupt and disable the associated device's interrupts.

10. The method of claim 9, wherein the single message writes to one register of the associated device to indicate acknowledgment of the interrupt and disable the associated device's interrupts.

11. The method of claim 5, wherein the requested operating resources perform:
    processing an Input/Output (I/O) request associated with the received interrupt;
    after processing the I/O request, reading interrupt status information in the memory to determine whether the associated device transmitted a subsequent interrupt; and
    if the associated device transmitted the interrupt, then requesting resources from the operating system to handle the subsequent interrupt.

12. A device coupled to a computer including a memory, comprising:
    control logic implemented in the device, wherein the control logic performs:
    (i) determining whether a new interrupt is pending at the device for an Input/Output (I/O) request;
    (ii) transmitting interrupt status information to the computer to write to the computer memory if the new interrupt is pending;
    (iii) if the new interrupt is pending, transmitting an interrupt signal to the computer to cause the computer to use the interrupt status information written to the computer memory to handle the new interrupt and the I/O request associated with the new interrupt; and
    (iv) receiving a request to write to a register, wherein the write to the register acknowledges the new interrupt and disables interrupts at the device.

13. A device coupled to a computer including a memory, comprising:
    control logic implemented in the device, wherein the control logic performs:
    (i) determining whether a new interrupt is pending for an Input/Output (I/O) request by determining whether a first interrupt status register content equals a second interrupt status register content, wherein if the first and second interrupt status register contents are equal, then the new interrupt is not pending, and wherein if the first and second interrupt status register contents are not equal, then the new interrupt is pending;

(ii) transmitting interrupt status information to the computer to write to the computer memory if the new interrupt is pending; and (iii) if the new interrupt is pending, transmitting an interrupt signal to the computer to cause the computer to use the interrupt status information written to the computer memory to handle the new interrupt and the I/O request associated with the new interrupt.

14. The device of claim 13, wherein the control logic further performs:

setting the second interrupt status register content to the first interrupt status register content if the first and second interrupt status register contents are not equal.

15. The device of claim 13, wherein the control logic further performs:

setting an interrupt request flag to indicate to transmit the interrupt signal if the new interrupt is pending, wherein the interrupt signal is transmitted if the interrupt request flag is set to indicate to transmit the interrupt signal.

16. A system for handling interrupts from a device, wherein the system is in communication with the device, comprising;

a processor;

a memory accessible to the processor;

an operating system executed by the processor; and a device driver capable of interfacing with the device, wherein the processor executes the device driver to perform:

(i) receiving a call requesting whether an interrupt received from a device is from the associated device;

(ii) reading interrupt status information in memory within the computer to determine whether the associated device transmitted the interrupt, wherein the associated device writes the interrupt status information to the memory; and (iii) if the associated device transmitted the interrupt, then requesting resources from the operating system to handle the interrupt.

17. The system of claim 16, wherein the processor executes the device driver to further perform:

if the associated device transmitted the interrupt, then indicating that the device did not transmit the interrupt.

18. The system of claim 16, wherein the processor executes the device driver to further perform:

sending at least one message to the device to acknowledge the interrupt and disable the associated device's interrupts.

19. The system of claim 18, wherein sending the at least one message comprises sending a single message to acknowledge the interrupt and disable the associated devices's interrupts.

20. The system of claim 19, wherein the single message writes to one register of the device to indicate acknowledgment of the interrupt and disable the associated device's interrupts.

21. The system of claim 16, wherein the system comprises one of a personal computer, a workstation, a server, a mainframe, a hand held computer, a palm top computer, a laptop computer, a network switch, a router, a telephony device, a network appliance, and a wireless device.

22. An article of manufacture implemented in a device for transmitting an interrupt signal from the device to a computer including a memory, wherein the article of manufacture causes operations to be performed, the operations comprising:

determining whether a new interrupt is pending at the device for an Input/Output (I/O) request;

transmitting interrupt status information to the computer to write to the computer memory if the new interrupt is pending;

if the new interrupt is pending, transmitting an interrupt signal to the computer to cause the computer to use the interrupt status information written to the computer memory to handle the new interrupt and the I/O request associated with the new interrupt; and receiving a request to write to a register, wherein the write to the register acknowledges the interrupt and disables interrupts at the device.

23. An article of manufacture implemented in a device for transmitting an interrupt signal from the device to a computer including a memory, wherein the article of manufacture causes operations to be performed, the operations comprising:

determining whether a new interrupt is pending for an Input/Output (I/O) request by determining whether a first interrupt status register content equals a second interrupt status register content, wherein if the first and second interrupt status register contents are equal, then the new interrupt is not pending, and wherein if the first and second interrupt status register contents are not equal, then the new interrupt is pending;

transmitting interrupt status information to the computer to write to the computer memory if the new interrupt is pending; and if the new interrupt is pending, transmitting an interrupt signal to the computer to cause the computer to use the interrupt status information written to the computer memory to handle the new interrupt and the I/O request associated with the new interrupt.

24. The article of manufacture of claim 23, further comprising:

setting the second interrupt status register content to the first interrupt status register content if the first and second interrupt status register contents are not equal.

25. The article of manufacture of claim 23, further comprising:

setting an interrupt request flag to indicate to transmit the interrupt signal if the new interrupt is pending, wherein the interrupt signal is transmitted if the interrupt request flag is set to indicate to transmit the interrupt signal.

26. An article of manufacture for handling interrupts in a computer including an operating system from a device, wherein the article of manufacture is capable of causing operations to be performed, the operations comprising:

receiving a call requesting whether an interrupt received from the device is from the device;

reading interrupt status information in memory within the computer to determine whether the device transmitted the interrupt, wherein the device writes the interrupt status information to the memory; and if the device transmitted the interrupt, then requesting resources from the operating system to handle the interrupt.

27. The article of manufacture of claim 26, further comprising:

claiming the interrupt if the device transmitted the interrupt.

28. The article of manufacture of claim 26, further comprising:
   if the device transmitted the interrupt, then indicating that the device did not transmit the interrupt.

29. The article of manufacture of claim 26, further comprising:
   sending at least one message to the device to acknowledge the interrupt and disable the device's interrupts.

30. The article of manufacture of claim 29, wherein sending the at least one message comprises sending a single message to acknowledge and disable the device's interrupts.

31. The article of manufacture of claim 30, wherein the single message writes to one register of the device to indicate acknowledgment of the interrupt and disable the device's interrupts.

32. The article of manufacture of claim 26, wherein the requested operating resources perform:
   processing an Input/Output (I/O) request associated with the received interrupt;
   after processing the I/O request, reading interrupt status information in the memory to determine whether an associated device transmitted a subsequent interrupt; and
   if the associated device transmitted the interrupt, then requesting resources from the operating system to handle the subsequent interrupt.

* * * * *